United States Patent
Kaneko et al.

(10) Patent No.: US 11,462,026 B2
(45) Date of Patent: Oct. 4, 2022

(54) IMAGE PROCESSING DEVICE AND METHOD FOR PROCESSING IMAGE

(71) Applicant: CLARION CO., LTD., Saitama (JP)

(72) Inventors: Takayuki Kaneko, Saitama (JP); Mamoru Kubota, Sagamihara (JP)

(73) Assignee: CLARION CO., LTD., Saitama (JP)

( * ) Notice: Subject to any disclaimer, the term of this patent is extended or adjusted under 35 U.S.C. 154(b) by 183 days.

(21) Appl. No.: 16/887,061

(22) Filed: May 29, 2020

(65) Prior Publication Data
US 2020/0380276 A1    Dec. 3, 2020

(30) Foreign Application Priority Data

May 30, 2019    (JP) .............................. JP2019-100927

(51) Int. Cl.
| | | |
|---|---|---|
| *G06V 20/58* | (2022.01) | |
| *G06V 20/56* | (2022.01) | |
| *B60W 30/06* | (2006.01) | |

(52) U.S. Cl.
CPC .......... *G06V 20/586* (2022.01); *G06V 20/588* (2022.01); *B60W 30/06* (2013.01); *B60W 2420/42* (2013.01)

(58) Field of Classification Search
CPC ... G06V 20/586; G06V 20/588; B60W 30/06; B60W 2420/42
See application file for complete search history.

(56) References Cited

U.S. PATENT DOCUMENTS

2015/0339535 A1* 11/2015 Utagawa ................ H04N 5/225
                                                                  348/118

FOREIGN PATENT DOCUMENTS

| EP | 2 927 076 | 10/2015 |
|---|---|---|
| EP | 3 553 744 | 10/2019 |
| JP | 2011-30140 | 2/2011 |
| JP | 2017-24598 | 2/2017 |
| WO | 2018/105179 | 6/2018 |

OTHER PUBLICATIONS

Sathyanarayana, S., "Detection of Road Markings for Advanced Driver Assistance", Nanyang Technological University, School of Computer Engineering, 2013, 33 pages total.
Extended European Search Report dated Sep. 23, 2020 in Corresponding European Patent Application No. 20176764.7.

* cited by examiner

*Primary Examiner* — Kenneth J Malkowski
(74) *Attorney, Agent, or Firm* — Wenderoth, Lind & Ponack, L.L.P.

(57) ABSTRACT

An image processing device includes an edge detector to detect a portion in which a luminance difference between neighboring pixels changes in a direction that increases equal to or more than a first predetermined value as a positive edge and a portion in which the luminance difference between neighboring pixels changes in a direction that decreases equal to or more than a second predetermined value as a negative edge, a grouping portion configured to group the positive edges that have been detected into a positive edge group and the negative edges that have been detected into a negative edge group, and a boundary line setting portion configured to set, as a boundary line: (i) a line connecting end points between the positive edges in the positive edge group; or (ii) a line connecting end points between the negative edges in the negative edge group.

4 Claims, 11 Drawing Sheets

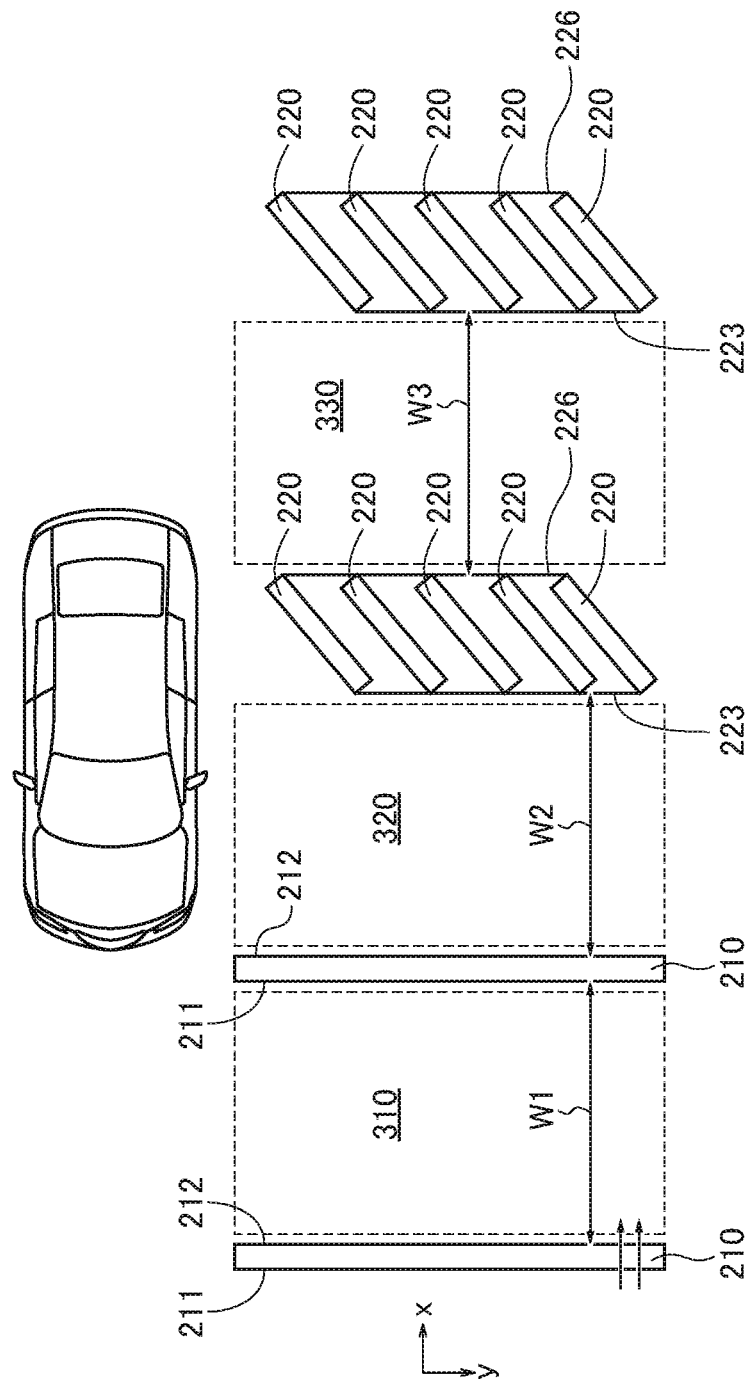

IMAGE PROCESSING DEVICE AND METHOD FOR PROCESSING IMAGE

CROSS-REFERENCE TO RELATED APPLICATION

This application is based upon and claims the benefit of priority from Japanese Patent Application No. 2019-100927 filed on May 30, 2019, the entire disclosure of which is incorporated herein by reference.

TECHNICAL FIELD

The present disclosure relates to an image processing device and a method for processing an image.

BACKGROUND ART

A parking section detection apparatus which automatically detects a partitioned parking section for a vehicle based on an image captured by cameras is disclosed in JP2017-024598A, for example.

SUMMARY

Markers that partition the parking sections includes boundary lines such as white lines extending parallel to a vehicle longitudinal direction and also markers indicating areas where vehicles are prohibited to enter or park.

For example, some parking spaces include an area formed by a plurality of diagonal lines arranged parallel to each other (hereinafter, referred to as a diagonal line area) such as a so-called zebra zone. The diagonal line area provides drivers with information that the entry and parking of the vehicles are prohibited in this area. Areas adjacent to the diagonal line area may be the parking sections.

With regard to the white line marker extending in the longitudinal direction of the vehicle, in a case where a parking section is automatically detected based on an image captured by a camera, a signal value of the image dramatically increases at a portion shifting from a road surface with no white line to the white line while the signal value of the image dramatically decreases at a portion shifting from the white line to the road surface with no white line.

In other words, a line segment of a rising edge (a positive edge) is detected at the portion shifting from the road surface with no white line to the white line while a line segment of a falling edge (a negative edge) is detected at the portion shifting from the white line to the road surface with no white line. When a pair of the positive edge and the negative edge are provided with a distance corresponding to the width of the white line, a portion between the pair of the positive edge and the negative edge can be detected as the white line.

However, the diagonal line area does not include white lines extending in the vehicle longitudinal direction so that the positive edge and the negative edge cannot be detected. Therefore, the conventional process described above cannot detect the boundary lines of the parking section adjacent to the diagonal line area.

An object of the present disclosure is to provide an image processing device and a method for processing an image that can set the boundary lines of the parking sections adjacent to the diagonal line area.

An image processing device according to a first aspect of the present disclosure includes a camera that is mounted on a vehicle, the camera being configured to capture an image around the vehicle, an edge detector that is configured to detect, with regard to pixels in an image captured by the camera, a portion in which a luminance difference between neighboring pixels changes in a direction that increases equal to or more than a first predetermined value by calculation as a positive edge and a portion in which the luminance difference between neighboring pixels changes in a direction that decreases equal to or more than a second predetermined value by calculation as a negative edge, a grouping portion that is configured to group a plurality of the positive edges and a plurality of the negative edges detected by the edge detector into a positive edge group and a negative edge group respectively by predetermined angular intervals, and a boundary line setting portion that is configured to set, as a boundary line, a line connecting corresponding end points between the positive edges in the positive edge group or to set, as a boundary line, a line connecting corresponding end points between the negative edges in the negative edge group.

A method for processing an image according to a second aspect of the present disclosure includes capturing an image around a vehicle by a camera that is mounted on the vehicle, detecting a portion in which an image signal value of the captured image increases equal to or more than a first predetermined value as a positive edge and a portion in which the image signal value of the captured image decreases equal to or more than a second predetermined value as a negative edge, grouping the detected positive edges and negative edges into a positive edge group and a negative edge group respectively by predetermined angular intervals, and setting, as a boundary line, a line connecting corresponding end points between the positive edges in the positive edge group or setting, as a boundary line, a line connecting corresponding end points between the negative edges in the negative edge group.

BRIEF DESCRIPTION OF DRAWINGS

FIG. 11 is a schematic view corresponding to the schematic view in FIG. 4 and showing the parking section partitioned by the sidelines and the boundary lines and the parking section partitioned by the two boundary lines.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, an embodiment of an image processing device and an image processing method according to the present disclosure will be described with reference to the drawings.

Figure 1:
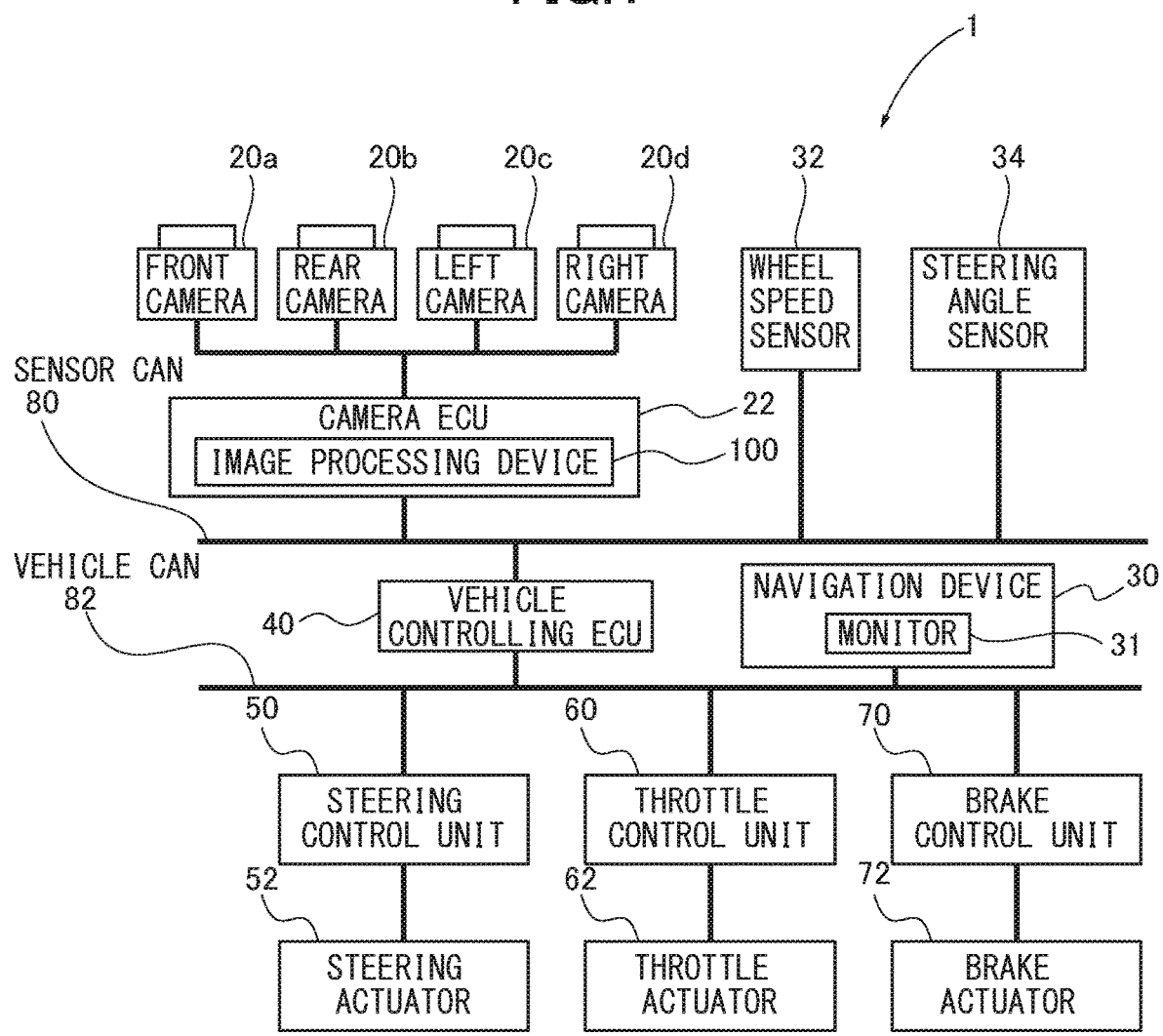
FIG. 1 is a block diagram showing a schematic configuration of a parking assist apparatus to which an embodiment of an image processing device of the present disclosure is applied.
Figure 2:
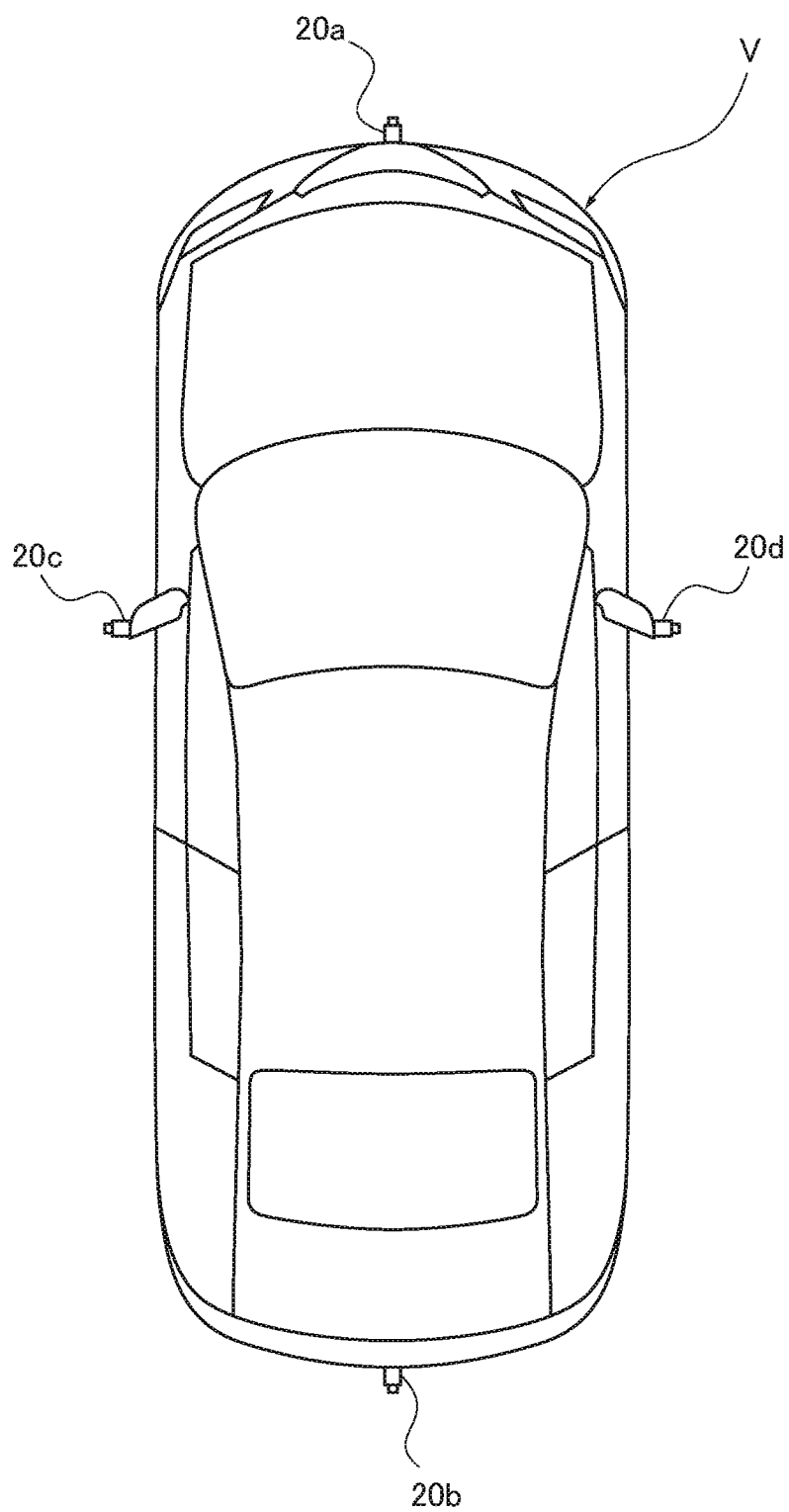
FIG. 2 is a schematic view showing an example of an arrangement of cameras (i.e. front camera, rear camera, left camera, and right camera) provided to the parking assist apparatus.

FIG. 1 is a block diagram showing a schematic configuration of a parking assist apparatus 1 to which an embodiment of an image processing device 100 of the present disclosure is applied. FIG. 2 is a schematic view showing an example of arrangement of cameras 20 (i.e. front camera 20a, rear camera 20b, left camera 20c, and right camera 20d) provided to the parking assist apparatus 1.

A parking assist apparatus 1 shown in FIG. 1 is installed in a vehicle V shown in FIG. 2 to carry out a parking assist operation. Specifically, the parking assist apparatus 1 is configured to detect a parking section of a parking area around the vehicle V based on images captured by the cameras (imaging devices) 20 of FIG. 2. The parking assist apparatus 1 then outputs signals to allow a vehicle control unit ECU 40 to guide the vehicle V to the parking section.

As illustrated in FIG. 1, the parking assist apparatus 1 includes a front camera 20a, a rear camera 20b, a left camera 20c, and a right camera 20d as well as a camera ECU 22. The parking assist apparatus 1 further includes a navigation device 30, a wheel speed sensor 32, and a steering angle sensor 34.

As illustrated in FIG. 2, the front camera 20a is installed at the front bumper or the radiator grill of the vehicle V to capture an image in front of the vehicle V. The rear camera 20b is installed at the rear bumper or the rear garnish of the vehicle V to capture an image behind the vehicle V. The left camera 20c is installed at the left-wing mirror of the vehicle V to capture a side view image on the left of the vehicle V. The right camera 20d is installed at the right-wing mirror of the vehicle V to capture a side view image on the right of the vehicle V.

Each of the front camera 20a, the rear camera 20b, the left camera 20c, and the right camera 20d has a wide-angle lens or a fisheye lens capable of monitoring a wide angle range such as 180 degrees. With these four cameras 20a-20d, the parking assist apparatus 1 is able to monitor the omnidirectional area of the vehicle V including the road surface around the vehicle V.

Hereinafter, the four cameras 20a to 20d may collectively be referred to as the "cameras 20".

The camera ECU 22 is configured mainly with a microcomputer including a Central Processing Unit (CPU), a Read Only Memory (ROM), a Random Access Memory (RAM), a flash memory, and the like. The camera ECU 22 controls the cameras 20. Further, the camera ECU 22 includes the image processing device 100 configured to realize, based on the information acquired by the cameras 20, processes such as generating an overhead image and detecting a parking section.

The navigation device 30 includes a monitor 31 to display images. The navigation device 30 further include a memory in which mapping data and the like is stored for navigation. The navigation device 30 is configured to navigate the vehicle V to a target point set by a user of the navigation device 30 based on the stored mapping data and a current position of the vehicle V detected by a GPS or the like (not illustrated). Various images during the navigation are displayed on the monitor 31.

The wheel speed sensor 32 is configured to detect a wheel speed of the vehicle V. The wheel speed detected by the wheel speed sensor 32 is input to the vehicle control unit ECU 40, which uses the input data to control the vehicle V.

The steering angle sensor 34 is configured to detect a steering angle of the vehicle V. When the vehicle V travels straight, the steering angle sensor 34 reads zero (0) degree (i.e. neutral position). The steering angle sensor 34 outputs a rotation angle with respect to the neutral position as the steering angle. The steering angle detected by the steering angle sensor 34 is input to the vehicle control unit ECU 40, which uses the input data to control the vehicle V.

In addition to the vehicle control unit ECU 40, the parking assist apparatus 1 includes a steering control unit 50, a throttle control unit 60, and a brake control unit 70.

The vehicle control unit ECU 40 is configured mainly with a microcomputer including a Central Processing Unit (CPU), a Read Only Memory (ROM), a Random Access Memory (RAM), a flash memory, and the like. The vehicle control unit ECU 40 is configured to realize various processes for assisting the vehicle V to be parked based on the information input from the camera ECU 22, the wheel speed sensor 32, and the steering angle sensor 34.

For example, when a driver presses or touches a switch (not illustrated) to activate the parking assist apparatus 1, the vehicle control unit ECU 40 realizes an automatic parking process to automatically park the vehicle V in the parking section acquired by the camera ECU 22.

The steering control unit 50 is configured to control the drive of a steering actuator 52 and accordingly the steering angle of the vehicle V based on the information determined by the vehicle control unit ECU 40.

The throttle control unit 60 is configured to control the drive of a throttle actuator 62 and accordingly the throttle valve of the vehicle V based on the information determined by the vehicle control unit ECU 40.

The brake control unit 70 is configured to control the drive of a brake actuator 72 and accordingly the brake of the vehicle V based on the information determined by the vehicle control unit ECU 40.

The camera ECU 22, the wheel speed sensor 32, and the steering angle sensor 34 are connected with the vehicle control unit ECU 40 via a sensor Controller Area Network (sensor CAN® bus) 80 using is a vehicle Local Area Network (LAN).

The steering control unit 50, the throttle control unit 60, and the brake control unit 70 are connected with the vehicle control unit ECU 40 via a vehicle CAN® bus 82 using a vehicle LAN.

Figure 3:
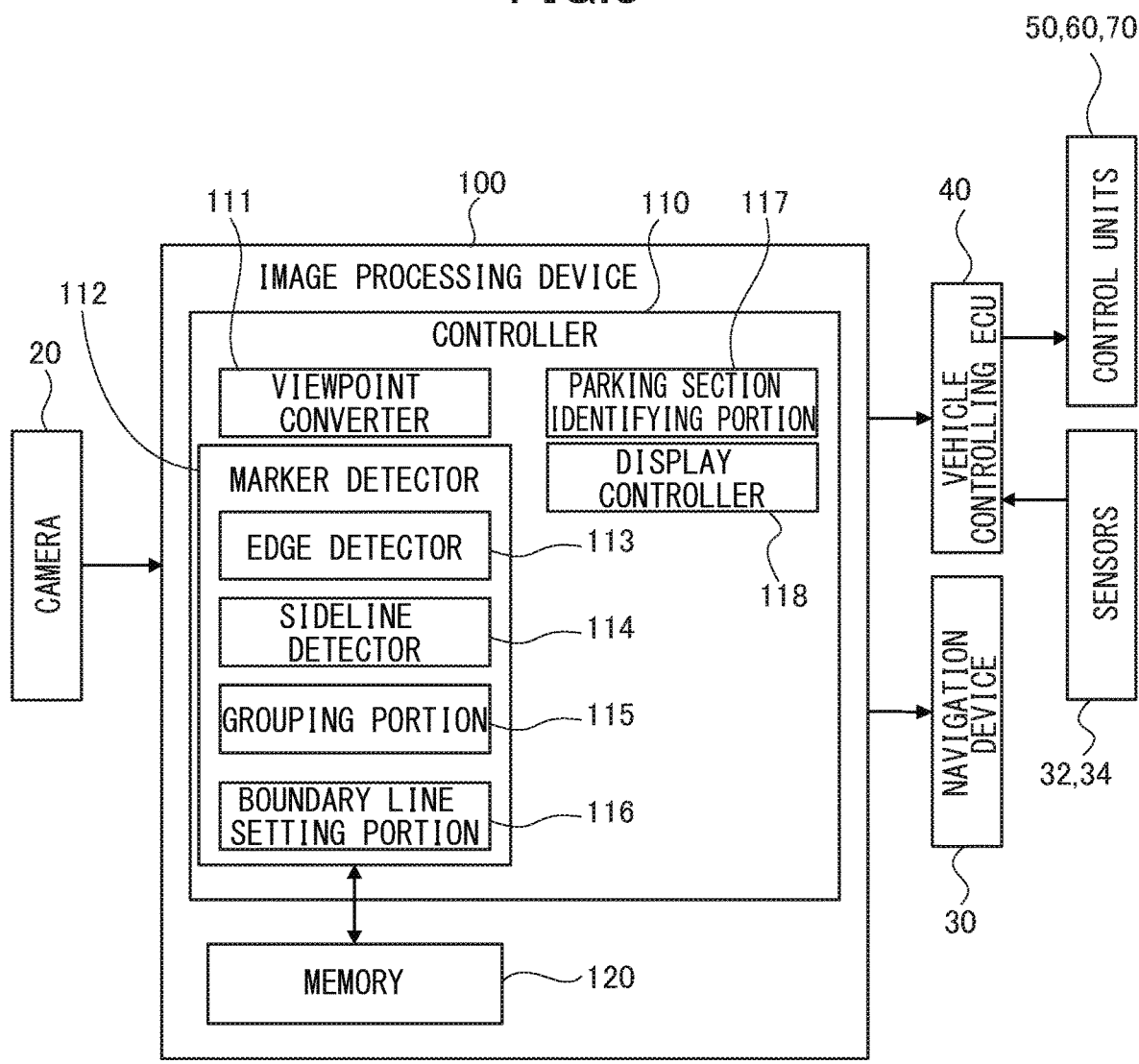
FIG. 3 is a functional block diagram showing a schematic configuration of the image processing device according to the embodiment.
Figure 4:
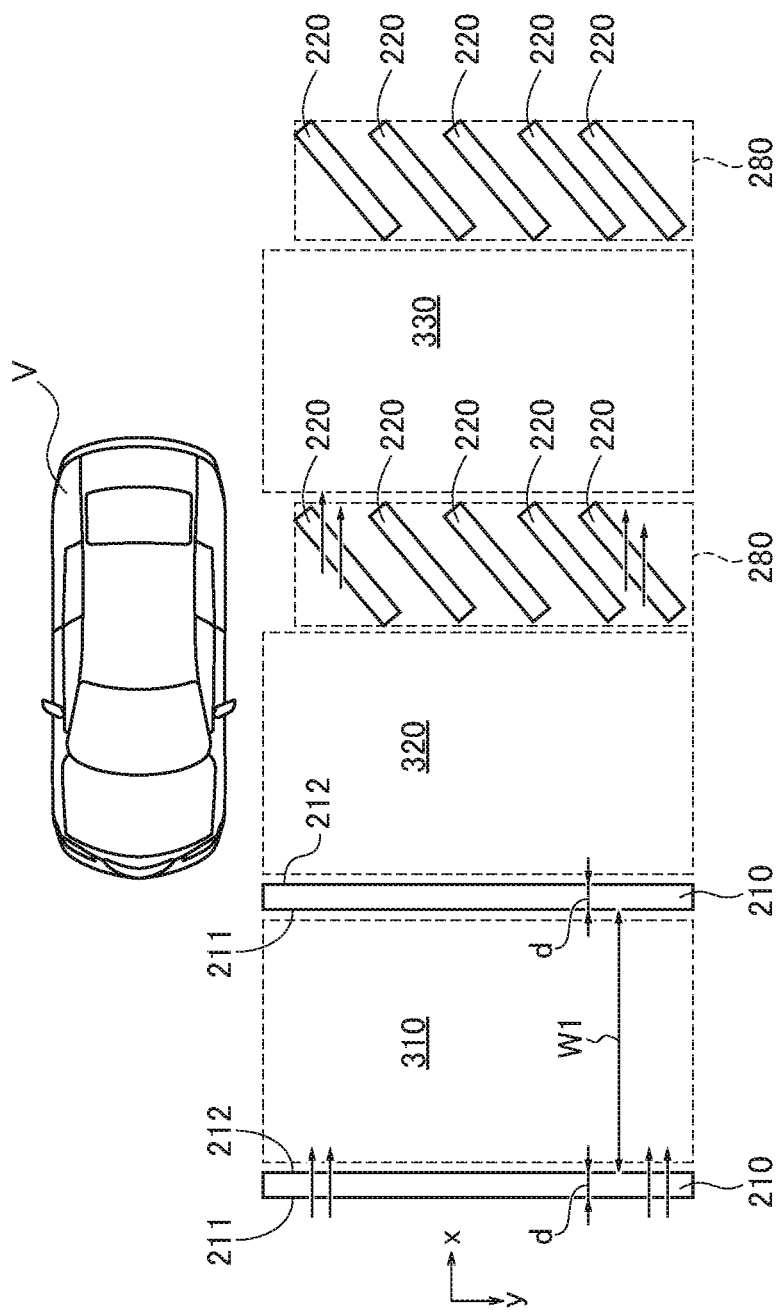
FIG. 4 is a schematic view showing a parking space including a parking section where both sides in a vehicle width direction are partitioned by sidelines extending in a longitudinal direction of a parked vehicle, a parking section where one of the sides in the vehicle width direction is partitioned by the sideline and the other of the sides is partitioned by a diagonal line area, and a parking section where the both sides in the vehicle width direction are partitioned by the diagonal line areas.

FIG. 3 is a functional block diagram showing a schematic configuration of the image processing device 100 according to the embodiment. FIG. 4 is a schematic view showing the parking space including a parking section 310 where both sides in the vehicle width direction are partitioned by the sidelines 210, 210 extending in the longitudinal direction of the parked vehicle V, a parking section 320 where one of the sides in the vehicle width direction is partitioned by the sideline 210 and the other of the sides is partitioned by a diagonal line area 280, and a parking section 330 where the both sides in the vehicle width direction are partitioned by the diagonal line areas 280, 280.

Figure 5:
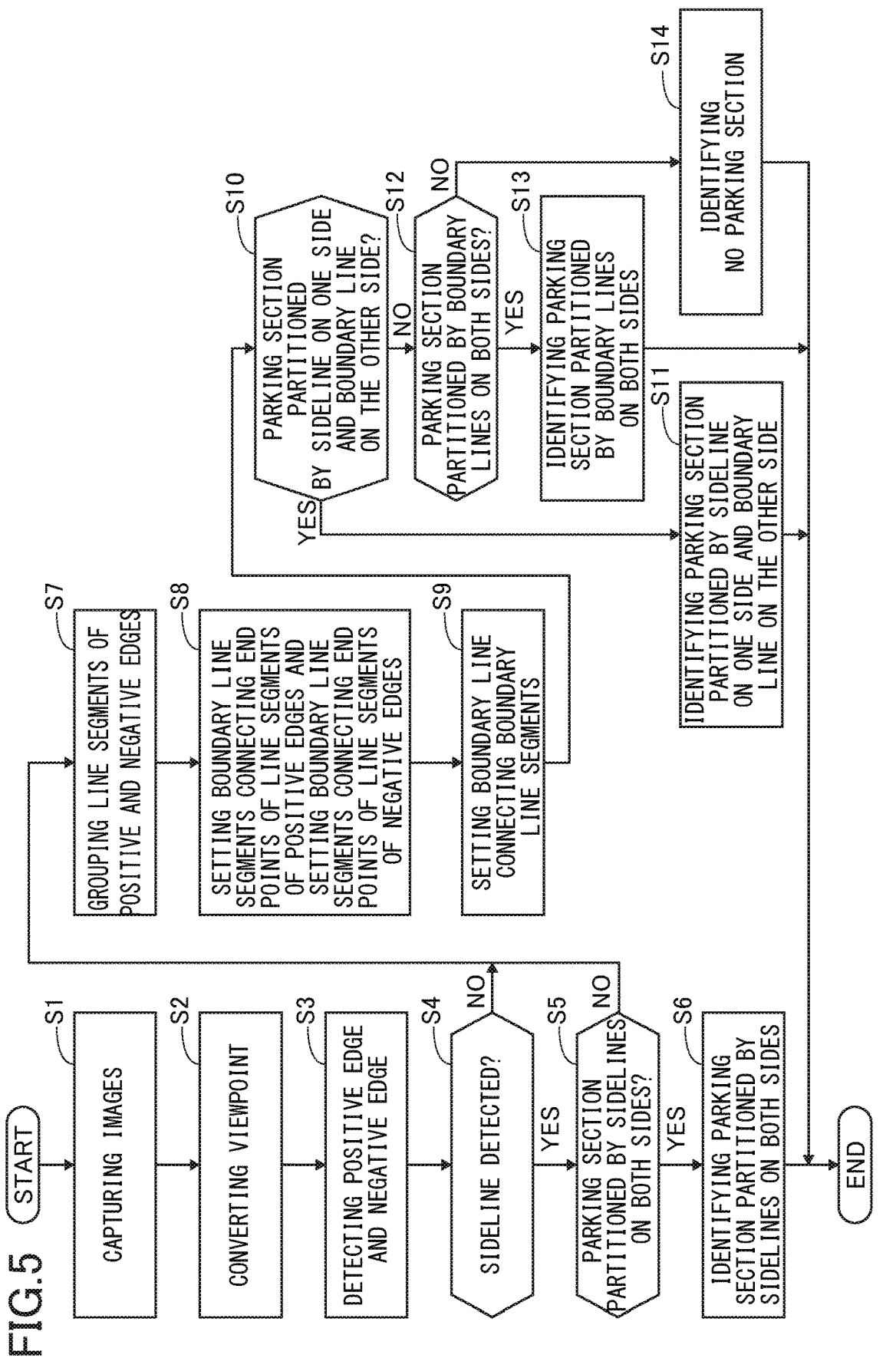
FIG. 5 is a flowchart showing processes for identifying the parking sections by the image processing device shown in FIG. 3.
Figure 6:
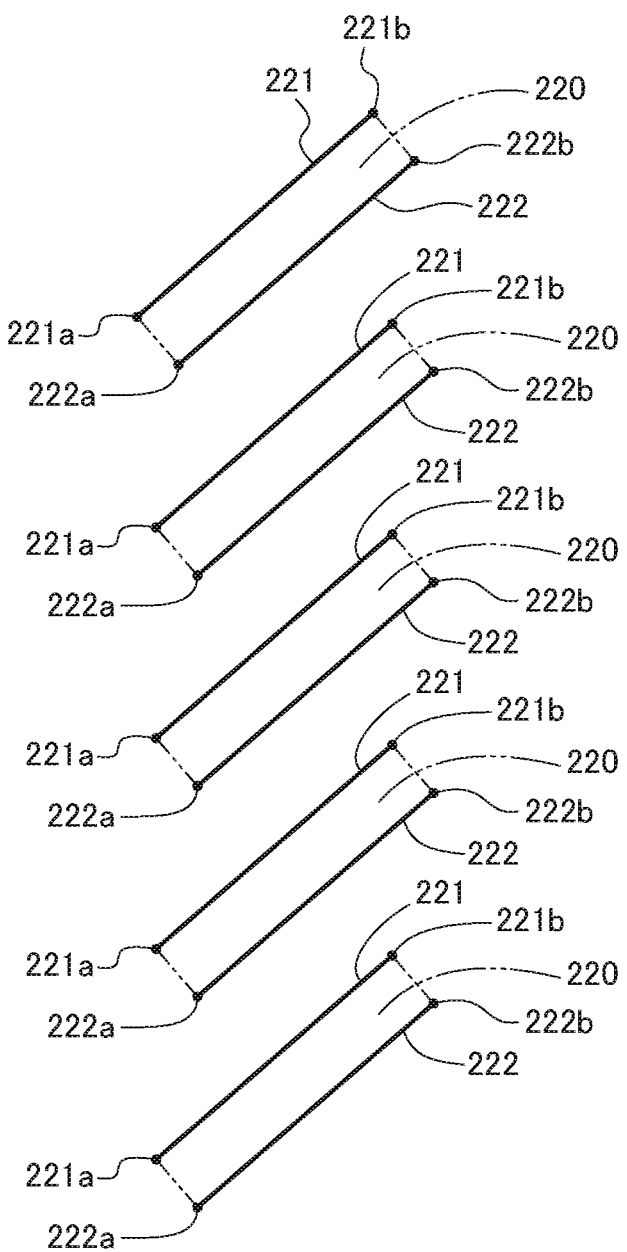
FIG. 6 is a schematic view showing positive edges and negative edges of diagonal lines in the diagonal line area formed by the diagonal lines arranged parallel to each other.

FIG. 5 is a flowchart showing processes for identifying the parking sections 310, 320, 330 by the image processing device 100 shown in FIG. 3. FIG. 6 is a schematic view showing line segments 221 of the positive edges and line segments 222 of the negative edges of the diagonal lines 220 in the diagonal line area 280 which is formed by the diagonal lines 220 arranged parallel to each other.

The image processing device 100 identifies the parking section 310, 320, or 330 shown in FIG. 4 and outputs to the vehicle controlling ECU 40 information (positions, shapes of the parking sections, etc.) related to the identified parking section 310, 320, or 330.

After acquiring the information related to the identified parking section 310, 320, or 330, the vehicle controlling ECU 40 controls the steering actuator 52, the throttle actuator 62, and controls the brake actuator 72 via the steering control unit 50, the throttle control unit 60, and the brake control unit 70, respectively in accordance with the preset program to guide the vehicle V to the identified parking section 310, 320 or 330 while monitoring the wheel speed and the steering angle detected by the wheel speed sensor 32 and the steering angle sensor 34. Thereby, the vehicle V can be properly parked in the identified parking section 310, 320, or 330.

The parking section 310 is a parking section where both sides in the vehicle width direction are partitioned by the sidelines 210, 210 extending in the longitudinal direction of the parked vehicle V. The parking section 320 is a parking section where one of the sides in the vehicle width direction is partitioned by the sideline 210 and the other of the sides is partitioned by the diagonal line area 280. The parking section 330 is a parking section where the both sides in the vehicle width direction are partitioned by the diagonal line areas 280, 280.

The diagonal line area 280 is an area including a plurality of diagonal lines 220 arranged parallel to each other. Each of the diagonal lines 220 is inclined with respective to the sideline 210. The diagonal line area 280 according to the present disclosure does not include outer lines entirely surrounding the diagonal line area 280 but includes only with the diagonal lines 220.

As illustrated in FIG. 3, the image processing device 100 includes a controller 110 and a memory 120.

The controller 110 is mainly configured with the CPU of the camera ECU 22 and entirely controls the image processing device 100. In addition to the CPU, the controller 110 further includes a programmable logic device such as an FPGA and arithmetic elements (i.e. integrated circuit) such as an ASIC.

The memory 120 is mainly configured with a ROM, a RAM, a flash memory, and the like of the camera ECU 22. The memory 120 stores a control program (not illustrated). The control program is executed by the controller 110 during the startup of the image processing device 100 to allow the image processing device 100 to realize the functional configuration shown in FIG. 3. The memory 120 further stores such as data of end points and the like, which are detected in the process of the controller 110, and the information related to the parking section 310.

As the image processing device 100 of the embodiment is expected to carry out high-speed processing, it is preferable to have arithmetic elements suitable for high-speed computing, such as an FPGA.

The controller 110 includes a viewpoint converter 111, a marker detector 112, a parking section identifying portion 117, and a display controller 118.

The viewpoint converter 111 acquires images captured by the four cameras 20 in Step S1 of FIG. 5. The four cameras 20 capture images of the road surface around the vehicle V (hereinafter, the images captured by the cameras 20 are also referred to as "through images"). The viewpoint converter 111 converts the acquired through images into overhead images similar to the view of FIG. 4 in Step S2. The overhead images allow the driver to look down the subject vehicle V form the air above vehicle V.

In addition to the viewpoint conversion, the viewpoint converter 111 may synthesize the four overhead images which correspond to the through images captured by the four cameras 20, and generate a single overhead image around the vehicle V.

The marker detector 112 includes an edge detector 113, a sideline detector 114, a grouping portion 115, and a boundary line setting portion 116.

The edge detector 113 executes an edge detection process for detecting the edges extending in a direction perpendicular to an x-direction by scanning the overhead image output from the viewpoint converter 111 in a certain direction, for example, the x-direction corresponding a horizontal direction in the overhead image (S3 in FIG. 5). The x-direction corresponds to the width direction of the parking sections 310, 320, 330 in the overhead image shown in FIG. 4. The edge is a portion where the brightness (pixel value (image signal value)) increases or decreases equal to or more than a predetermined value. It should be noted that the predetermined value for the positive edge and the predefined value for the negative edge may be identical to each other or may be different from each other.

The edge may be, for example, a portion having a luminance difference (change in luminance) of eight or more on a YUV image represented by an 8-bit image signal value (0 to 255). In a case where the 8-bit image signal values 0 to 255 are compressed and handled in correspondence with image signal values 0 to 127, a portion having a luminance difference of four or more may be set as the edge. These values are only examples and a portion having the luminance difference greater than the above values may be set as the edge.

Hereinafter, the edge where the image signal value increases from a relatively small value to a relatively larger value (i.e. rising edge) is referred to as a positive edge. On the other hand, the edge where the image signal value decreases from the relatively large value to the relatively small value (i.e. falling edge) is referred to as a negative edge. The edge detector 113 detects the positive edges and the negative edges.

The sidelines 210 which are boundary lines of the parking section 310 and the diagonal lines 220 of the diagonal line area 280 are drawn or painted, for example, in white or yellow which are brighter than other portions of the road surface (i.e. with high brightness value). Accordingly, the edge detector 113 detects the positive edge at a portion shifting from the road surface without the sideline 210 or the diagonal line 220 to the sideline 210 or the diagonal line 220. Also, the edge detector 113 detects the negative edge at a portion shifting from the sideline 210 or the diagonal line 220 to the road surface without the sideline 210 or the diagonal line.

It should be noted that the sidelines 210 and the diagonal lines 220 are not limited to the ones drawn or painted in white or yellow. The sidelines 210 and the diagonal lines 220 cannot be drawn or painted in colors darker than the portions of the road surface without the sidelines 210 and the diagonal lines 220 but may be drawn or painted in colors brighter than the portions of the road surface which do not include the sidelines 210 and the diagonal lines 220.

The edge detector 113 executes the scanning in the x-direction a plurality of times by shifting a target to be scanned in a direction different from the scanning direction, i.e. the x-direction. The shifting direction may be a y-direction perpendicular to the x-direction (i.e. front and rear directions of the vehicle V parked in the parking section), for example. The edge detector 113 detects line segments of the positive edges extending in the predetermined direction if the positive edges are detected in a substantially straight line in the predetermined direction. This scanning process is also applied to the detection of the line segments of the negative edges.

The edge detector 113 detects line segments 211 of the positive edges and line segments 212 of the negative edges of the sidelines 210. Also, the edge detector 113 detects line segments 221 of the positive edges and line segments 222 of the negative edges of the diagonal lines 220 in the diagonal line area 280 formed by the diagonal lines 220 arranged parallel to each other (see FIG. 6).

The sideline detector 114 detects the sidelines 210 which partition the parking section 310, 320. The sidelines 210 extend in the longitudinal direction of the vehicle V parked in the parking section. Specifically, the sideline detector 114 selects the line segments 211 of the positive edges and the line segments 212 of the negative edges extending in the y-direction from the line segments 211, 221 of the positive edges and the line segments 212, 222 of the negative edges detected by the edge detector 113. The y-direction corresponds to the longitudinal direction of the vehicle V parked in the parking section 310.

The sideline detector 114 determines whether the selected line segments 211, 212 are paired with a predetermined distance d therebetween and longer than a predetermined length. In a case that the selected line segments 211, 212 are paired with the predetermined distance d therebetween and longer than the predetermined length (i.e. YES in S4 shown in FIG. 5), the sideline detector 114 detects such line segments 211, 212 as the sidelines 210 (i.e. markers) partitioning the parking section 310.

The predetermined distance d is set to be within a range of the width of the sideline 210 generally used for the boundary line of the parking section 310. In addition, the predetermined distance d does not have a single value, but has values ranging from a minimum value to a maximum value. Similarly, the predetermined length is set to be within a range of the length of the sideline 210 generally used for the boundary line of the parking section.

The sideline detector 114 determines that the sidelines 210 do not exist on the road surface in a case where the line segments 211 of the positive edges are only detected but the line segments 212 of the negative edges which are supposed to be paired with the line segments 211 are not detected within the predetermined distance d even when the line segments 211, 212 are extending in the y-direction, for example. In this case, the sideline detector 114 does not detect the sidelines 210.

As such a case, it is assumed that a shadow of the vehicle V or the like is cast on the road surface and a portion of the road surface is shifting from the shadow side to a sunny side of the road surface, for example. In this shifting portion, the line segment 211 of the positive edge is detected but the line segment 212 of the negative edge which is supposed to be paired with the line segment 211 of the positive edge is not detected. Accordingly, the sideline detector 114 determines that the sidelines 210 do not exist on the road surface.

Similarly, the sideline detector 114 determines that the sidelines 210 do not exist on the road surface in a case where the line segments 212 of the negative edges are only detected, for example. As the case where the line segments 212 of the negative edges are only detected, it is assumed that the shadow of the vehicle V or the like is cast on the road surface and a portion of the road surface is shifting from the sunny side to the shadow side of the road surface, for example. In this case, the sideline detector 114 determines that the sidelines 210 do not exist on the road surface.

In a case where a shadow of a utility or power pole is casted on the road surface, for example, the line segment 212 of the negative edge and the line segment 211 of the positive edge may be paired with the predetermined distance d therebetween. However, the shadow of the utility pole is darker than the sunny side of the road surface and recognized as a line darker than the road surface. In other words, the darker line is not brighter than the road surface unlike the sideline 210. Therefore, the sideline detector 114 determines that the sideline 210 does not exist on the road surface even in this case.

Specifically, the sideline detector 114 detects the sideline 210 when the line segment 212 of the negative edge exists within the predetermined distance d from the line segment 211 of the positive edge. On the other hand, the sideline detector 114 does not detect the sideline 210 even when the line segment 211 of the positive edge exists within the predetermined distance d from the line segment 212 of the negative edge. Thereby, the sideline detector 114 does not erroneously detect the darker line such as the shadow of the utility pole as the sideline 210 so that the erroneous detection of the noise can be eliminated.

The sideline detector 114 does not detect the diagonal lines 220 inclined with respect to the y-direction (i.e. a direction perpendicular to the x-direction) as the sidelines since the sideline detector 114 detects the sidelines 210 extending in the y-direction.

Figure 7:
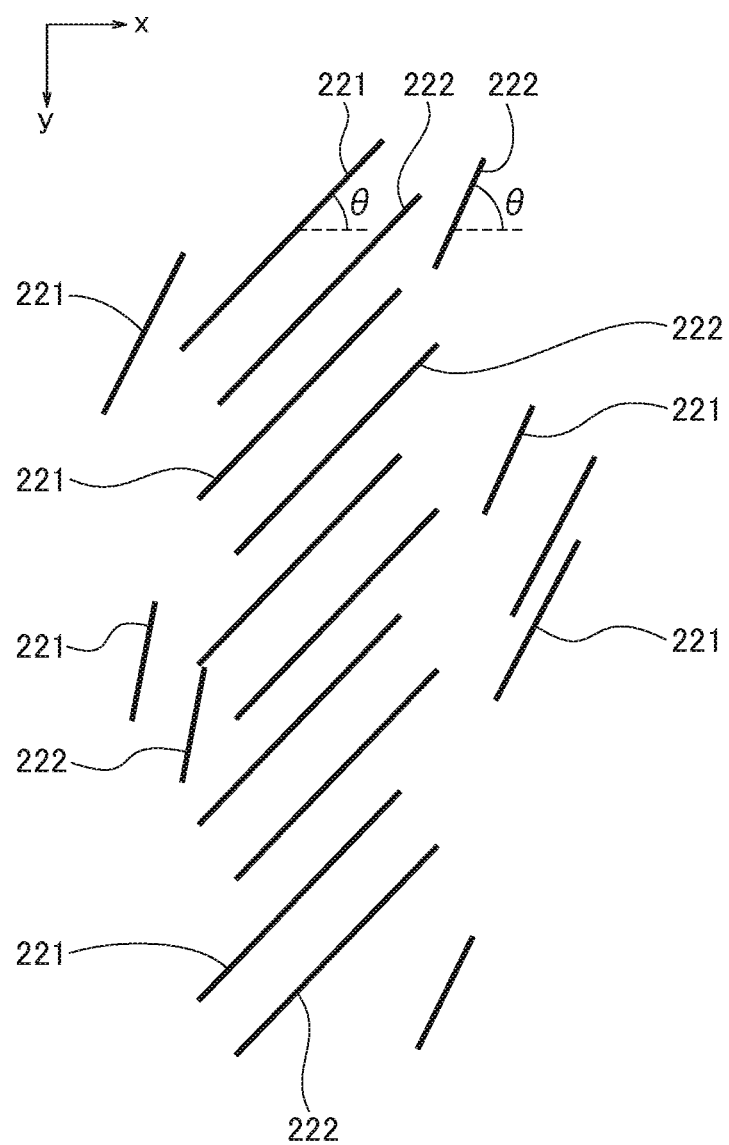
FIG. 7 is a schematic view showing line segments of the positive edges and the negative edges detected by an edge detector.
Figure 8:
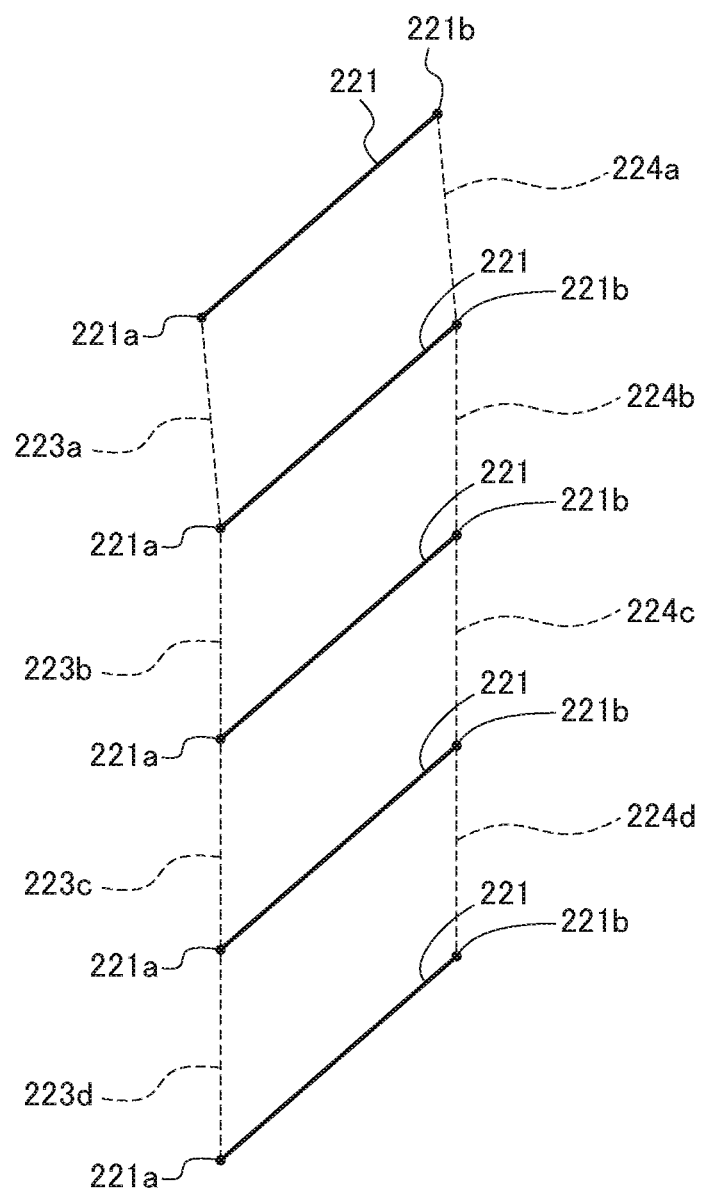
FIG. 8 is a schematic view showing boundary line segments connecting end points of the line segments of the positive edges.

FIG. 7 is a schematic view showing the line segments 221 of the positive edges and the line segments 222 of the negative edges detected by the edge detector 113. FIG. 8 is a schematic view showing boundary line segments 223a, 223b, 223c, 223d connecting end points 221a of the line segments 221 of the positive edges and boundary line segments 224a, 224b, 224c, 224d connecting end points 221b of the line segments 221.

Figure 9:
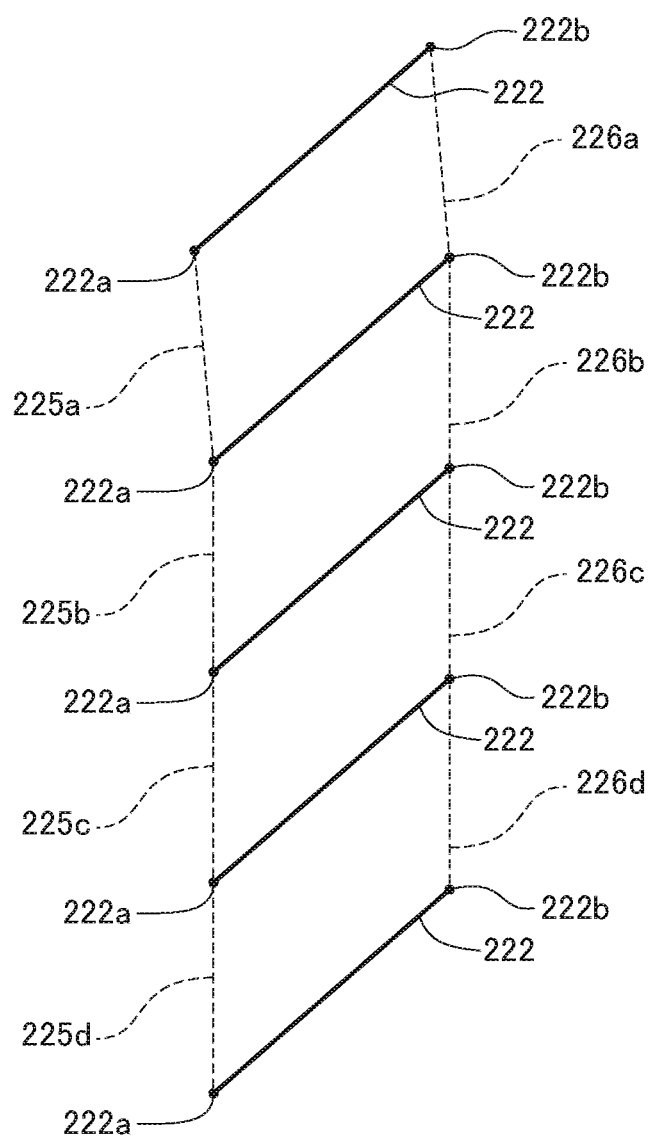
FIG. 9 is a schematic view showing boundary line segments connecting end points of the line segments of the negative edges.
Figure 10:
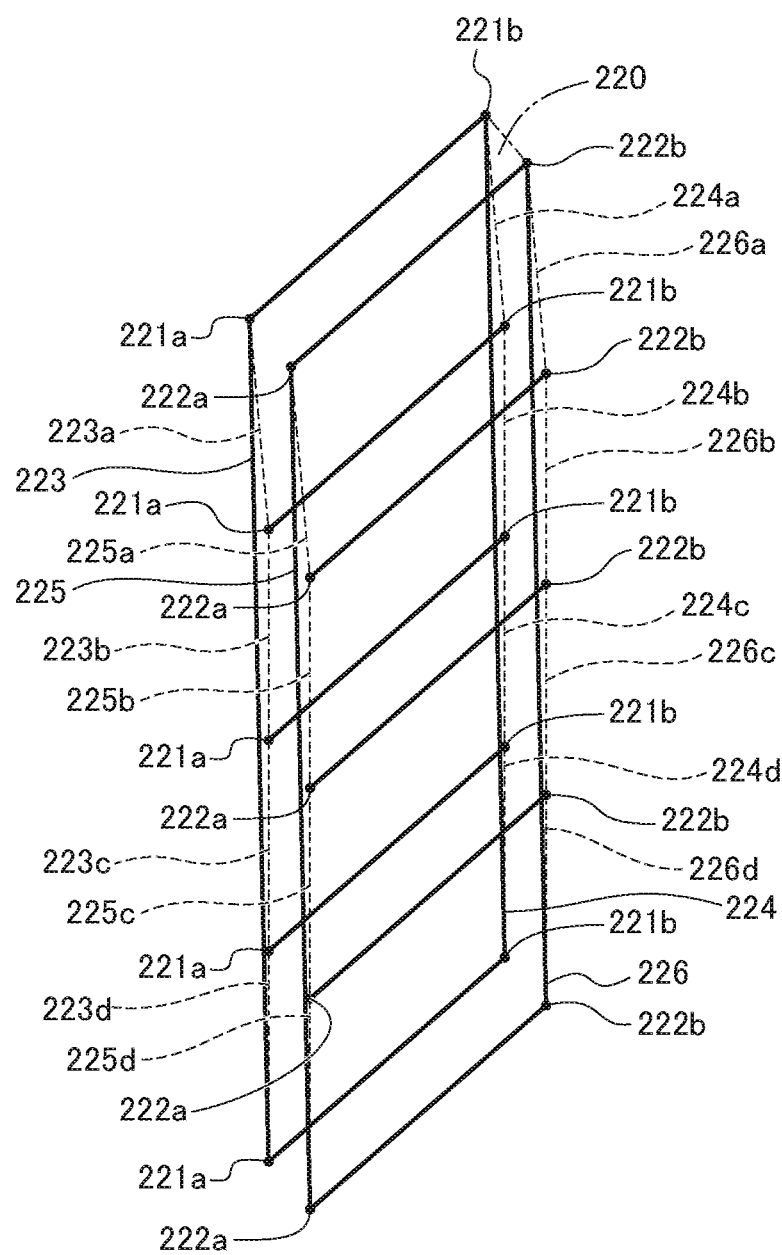
FIG. 10 is a schematic view showing boundary lines connecting the boundary line segments.

FIG. 9 is a schematic view showing boundary line segments 225a, 225b, 225c, 225d connecting end points 222a of the line segments 222 of the negative edges and boundary line segments 226a, 226b, 226c, 226d connecting end points 222b of the line segments 222. FIG. 10 is a schematic view showing boundary lines 223, 224, 225, 226 connecting the boundary line segments.

FIG. 11 corresponding to FIG. 4 is a schematic view illustrating the parking section 320 partitioned by the sideline 210 and the boundary line 223 and the parking section 330 partitioned by the two boundary lines 223, 226.

The grouping portion 115 groups the line segments of the positive edges and the line segments of the negative edges for a positive edge group and a negative edge group by predetermined angular intervals. The boundary line setting portion 116 sets the boundary lines 223, 226 of the diagonal line area 280 as the markers which partition the parking sections 320, 330 based on the overhead image (see FIGS. 10, 11).

In other words, the grouping portion 115 groups the line segments 211, 221 of the positive edges and the line segments 212, 222 of the negative edges detected by the edge detector 113 for each of the line segments 211, 221 of the positive edges and the line segments 212, 222 of the negative edges by the predetermined angular intervals (e.g. angular interval of five degrees) (S7 in FIG. 5).

Specifically, the grouping portion 115 groups the line segments 211, 221 of the positive edges and the line segments 212, 222 of the negative edges into groups in which the directions of the line segments are close to each other. For example, the line segments extend in directions with an inclination angle θ relative to the x-direction excluding a direction perpendicular to the x-direction.

Then, the boundary line setting portion 116 collectively groups three groups whose inclination angles θ are continuous with each other out of groups grouped by the grouping portion 115. For example, the three groups includes a group to which the line segments of the edges with 36 to 40 degrees of the inclination angle θ belong, a group to which the line segments of the edges with 41 to 45 degrees of the inclination angle θ belong, and a group to which the line segments of the edges with 46 to 50 degrees of the inclination angle θ belong.

This collective grouping of the three groups compensates the assignment of the line segments of the edges into different groups because of an improper setting of the boundaries between the groups upon grouping for example, even though the line segments of the edges should have been assigned to the same group with other line segments of the edges since the extending directions are similar to each other. If such compensation is unnecessary, the line segments of the edges belonging to the same group may be set as subjects for subsequent processes.

As described above, the three groups include the group to which the line segments of the edges with 36 to 40 degrees of the inclination angle θ belong, the group to which the line segments of the edges with 41 to 45 degrees of the inclination angle θ belong, and the group to which the line segments of the edges with 46 to 50 degrees of the inclination angle θ belong. In addition to these three groups, adjacent groups whose inclination angles θ are sequentially shifted are also collectively grouped into sets of three groups as described below.

For example, the groups of the line segments of the edges which are grouped for every five degrees of the inclination angle θ are set as follows:

Group G1 to which the line segments of the edges with 1 to 5 degrees of the inclination angle θ belong
Group G2 to which the line segments of the edges with 6 to 10 degrees of the inclination angle θ belong
Group G3 to which the line segments of the edges with 11 to 15 degrees of the inclination angle θ belong
Group G4 to which the line segments of the edges with 16 to 20 degrees of the inclination angle θ belong
Group G5 to which the line segments of the edges with 21 to 25 degrees of the inclination angle θ belong
Group G6 to which the line segments of the edges with 26 to 30 degrees of the inclination angle θ belong
Group G7 to which the line segments of the edges with 31 to 35 degrees of the inclination angle θ belong
Group G8 to which the line segments of the edges with 36 to 40 degrees of the inclination angle θ belong
Group G9 to which the line segments of the edges with 41 to 45 degrees of the inclination angle θ belong
Group G10 to which the line segments of the edges with 46 to 50 degrees of the inclination angle θ belong
Group G11 to which the line segments of the edges with 51 to 55 degrees of the inclination angle θ belong
Group G12 to which the line segments of the edges with 56 to 60 degrees of the inclination angle θ belong
Group G13 to which the line segments of the edges with 61 to 65 degrees of the inclination angle θ belong
Group G14 to which the line segments of the edges with 66 to 70 degrees of the inclination angle θ belong
Group G15 to which the line segments of the edges with 71 to 75 degrees of the inclination angle θ belong
Group G16 to which the line segments of the edges with 76 to 80 degrees of the inclination angle θ belong
Group G17 to which the line segments of the edges with 81 to 85 degrees of the inclination angle θ belong
Group G18 to which the line segments of the edges with 86 to 89 degrees of the inclination angle θ belong In this case, sets of adjacent three groups which are collectively grouped by sequentially shifting the inclination angles θ are as follows:

a set of Groups G1, G2, G3
a set of Groups G2, G3, G4
a set of Groups G3, G4, G5
a set of Groups G4, G5, G6
a set of Groups G5, G6, G7
a set of Groups G6, G7, G8
a set of Groups G7, G8, G9
a set of Groups G8, G9, G10
a set of Groups G9, G10, G11
a set of Groups G10, G11, G12
a set of Groups G11, G12, G13
a set of Groups G12, G13, G14
a set of Groups G13, G14, G15
a set of Groups G14, G15, G16
a set of Groups G15, G16, G17
a set of Groups G16, G17, G18

It should be noted that the predetermined angular interval in one Group Gi (i=1, 2, . . . , 18) are not limited to five degrees. For example, the predetermined angular interval may be set to degrees smaller than five degrees such as four degrees, three degrees, or two degrees. Alternatively, the predetermined angular interval may be set to degrees larger than five degrees such as six degrees, seven degrees, or eight degrees.

In the line segments of the edges belonging to a set of three Groups Gi, G(i+1), G(i+2) collectively grouped, the extending directions of the line segments (i.e. the angle θ relative to the x-direction in FIG. 7) are relatively close to each other (difference of the inclination angles θ is equal to or smaller than fifteen degrees in the present embodiment). The collective grouping process for adjacent three Groups Gi, G(i+1), G(i+2) is a process for extracting the line segments 221 of the positive edges and the line segments 222 of the negative edges corresponding to the diagonal lines 220 of the diagonal line area 280 which extend substantially parallel to each other.

Specifically, when the edge detector 113 detects the line segments 221 of the positive edges and the line segments 222 of the negative edges extending in different directions as shown in FIG. 7, the grouping portion 115 groups the detected line segments 221, 222 whose inclination angles θ are close to each other as shown in FIG. 6.

Next, the boundary line setting portion 116 forms pairs of the line segments 221 of the positive edges from the line segments 221 belonging to the set of three groups collectively grouped with the continuous inclination angles θ. Each of the line segments 221 includes an end point 221a at one end and an end point 221b at the other end. Then, the boundary line setting portion 116 sets the boundary line segments 223a, 223b, 223c, 223d connecting the end points 221a, 221a of the paired line segments 221, 221 and the boundary line segments 224a, 224b, 224c, 224d connecting the end points 221b, 221b of the paired line segments 221, 221 as shown in FIG. 8 (S8 in FIG. 5).

To simplify the drawing, FIG. 8 only illustrates the boundary line segments 223a, 223b, 223c, 223d connecting the end points 221a, 221a and the boundary line segments 224a, 224b, 224c, 224d connecting the end points 221b, 221b. However, the boundary line setting portion 116 sets the boundary line segments connecting the end points 221a, 221a and the boundary line segments connecting the end points 221b, 221b with regard to all pairs of the line segments 221, 221 of the positive edge.

The boundary line setting portion 116 also forms pairs of the line segments 222 of the negative edges from the line segments 222 belonging to the set of three groups collectively grouped. Then, the boundary line setting portion 116 sets the boundary line segments 225a, 225b, 225c, 225d connecting the end points 222a, 222a of the paired line segments 222, 222 and the boundary line segments 226a, 226b, 226c, 226d connecting the end points 222b, 222b of the paired line segments 222, 222 as shown in FIG. 9 (S8 in FIG. 5).

Similar to the boundary line segments of the line segments 221, 221 of the positive edges, the boundary line setting portion 116 also sets the boundary line segments connecting the end points 222a, 222a and the boundary line segments connecting the end points 222b, 222b with regard to all pairs of the line segments 222, 222 of the negative edges in addition to the two pairs of the line segments 222, 222 of the negative edges shown in FIG. 9.

The boundary line setting portion 116 only extracts, from the boundary line segments 223a, 223b, 223c, 223d corresponding to the line segments 221 of the positive edges, the boundary line segments in which the extending directions and the lengths are substantially the same or in which the extending directions fall within a predetermined range of directions and the lengths fall within a predetermined range of lengths to remove noise components. Then, the extracted two or more boundary line segments are connected to set the boundary lines 223, 224 corresponding to the line segments 221 of the positive edges as shown in FIG. 10. Also, the extracted two or more boundary line segments are connected to set the boundary lines 225, 226 corresponding to the line segments 222 of the negative edges as shown in FIG. 10.

Further, the boundary line setting portion 116 selects the boundary lines 223, 226 whose end points are located outward of other end points in the vehicle width direction (i.e. the x-direction) from the boundary lines 223, 224 corresponding to the line segments 221 of the positive edges and the boundary lines 225, 226 corresponding to the line segments 222 of the negative edges. Then, the boundary line setting portion 116 sets the selected two boundary lines 223, 226 as the boundary lines of the diagonal line area 280 (S9 in FIG. 5).

With regard to the overhead image shown in FIG. 4, the sideline detector 114 detects the two sidelines 210, 210 partitioning the parking section 310, and the boundary line setting portion 116 sets the boundary lines 223, 226 partitioning the parking sections 320, 330.

With regard to the parking section 310, the parking section identifying portion 117 determines whether the distance between the two sidelines 210, 210 detected by the sideline detector 114 falls within a predetermined threshold value W1 shown in FIG. 11. In a case that the distance between the two sidelines 210, 210 falls within the threshold value W1 (i.e. YES in S5 shown in FIG. 5), the parking section identifying portion 117 identifies an area between the two sidelines 210, 210 as the parking section 310 (S6 in FIG. 5).

It should be noted that the threshold value W1 is set to have a dimension in the width direction generally set to the parking section 310 and the like.

The parking section 320 adjacent to the parking section 310 is partitioned by the sideline 210 on one side, i.e. on the left side in the figure, but is not partitioned by the sideline 210 on the other side, i.e. on the right side in the figure. Accordingly, the parking section identifying portion 117 identifies that the parking section 320 is not the parking section partitioned by the sidelines 210, 210 on both sides (i.e. NO in S5 shown in FIG. 5).

Then, as shown in FIG. 11, the parking section identifying portion 117 determines with regard to the parking section 320 whether the distance between the sideline 210 detected by the sideline detector 114 and the boundary line 223 set by the boundary line setting portion 116 falls within a predetermined threshold value W2 or not.

In a case that the distance between the sideline 210 and the boundary line 223 falls within the threshold value W2 (i.e. YES in S10 shown in FIG. 5), the parking section identifying portion 117 identifies that an area between the sideline 210 and the boundary line 223 as the parking section 320 partitioned by the sideline 210 on one side and partitioned by the boundary line 223 (or the boundary line 226) on the other side (S11 shown in FIG. 5).

It should be noted that the threshold value W2 is set to have a dimension in the width direction generally set to the parking section 320 and the like.

With regard to the parking section 330 adjacent to the parking section 320, the parking section identifying portion 117 determines that the parking section 330 is not the parking section partitioned by the sideline 210 on one side and partitioned by the boundary line 223 or 226 on the other side since the parking section 330 is partitioned by the boundary lines 223, 226 on either side thereof (i.e. NO in S10 shown in FIG. 5).

Then, the parking section identifying portion 117 determines with regard to the parking section 330 whether the distance between the boundary lines 223, 226 set by the boundary line setting portion 116 falls within a predetermined threshold value W3 shown in FIG. 11.

In a case that the distance between boundary lines 223, 226 falls within the threshold value W3 (i.e. YES in S12 shown in FIG. 5), the parking section identifying portion 117 identifies an area between the boundary lines 223, 226 as the parking section 330 (S13 in FIG. 5).

It should be noted that the threshold value W3 is set to have a dimension in the width direction generally set to the parking section 330 and the like.

The parking section identifying portion 117 does not identify parking sections in a case that the parking section is not partitioned by the boundary lines 223, 226 on the both side or the distance between the boundary lines 223, 226 does not fall within the threshold value W3 (i.e. NO in S12 shown in FIG. 5). Then, the process is terminated (S14 in FIG. 5).

When the parking section identifying portion 117 identifies the parking section 310, 320, or 330 as described above, the information related to the identified parking section 310, 320, or 330 is stored in the memory 120 and output to the vehicle controlling ECU 40.

After acquiring the information related to the parking section 310, 320, or 330, the vehicle controlling ECU 40 executes the automatic parking process to guide the vehicle V to the identified parking section 310, 320 or 330 and automatically park the vehicle V therein.

In addition, the display controller 118 of the image processing device 100 displays the overhead image and the set parking section 310, 320 or 330 on the monitor 31 of the navigation device 30. Thereby, a driver can monitor the vehicle V while being guided to the parking section 310, 320 or 330.

The image processing device 100 and the method for processing the image according to the present embodiment can properly detect the parking section 310 partitioned by the sidelines 210, the parking section 320 (adjacent to the diagonal line area 280) partitioned by the sideline 210 and the diagonal line area 280, and the parking section 330 (between the two diagonal line areas 280) partitioned by the two diagonal line area 280.

The image processing device 100 and the method for processing the image according to the present embodiment detect the sidelines and set the boundary lines based on the overhead image acquired by executing the viewpoint conversion to the through image. However, the image processing device and the method for processing the image according to the present disclosure are not limited to the ones executing the process to the overhead image and may execute the process to the through image before the viewpoint conversion or to an image to which another process has been executed.

The image processing device 100 according to the present embodiment includes the sideline detector 114. However, the image processing device according to the present disclosure may not include the sideline detector 114. Similarly, the method for processing the image according to the present disclosure may not detect the sidelines.

In addition, the image processing device 100 according to the present embodiment includes the parking section identifying portion 117. However, the image processing device according to the present disclosure may not include the parking section identifying portion 117. Also, the method for processing the image according to the present disclosure may not identify the parking section but only set the boundary lines.

Although the present disclosure has been described in terms of an exemplary embodiment, it should not be limited thereto. It should be appreciated that variations or modifications may be made in the embodiments described by persons skilled in the art without departing from the scope of the present invention as defined by the following claims.

What is claimed is:

1. An image processing device, comprising:
    a processor; and
    a non-transitory computer-readable medium having stored thereon executable instructions that, when executed by the processor, cause the image processing device to function as:
    a viewpoint converter that is configured to: (i) acquire images captured by a camera that is mounted on a vehicle and configured to capture the images around the vehicle; and (ii) convert the images that have been acquired into an overhead image;
    an edge detector that is configured to: (i) detect, with regard to pixels in the overhead image, a portion in which a luminance difference between neighboring pixels changes in a direction that increases equal to or more than a first predetermined value by calculation as a line segment of a positive edge and a portion in which the luminance difference between neighboring pixels changes in a direction that decreases equal to or more than a second predetermined value by calculation as a line segment of a negative edge; and (ii) execute an edge detection process for detecting line segments of positive edges and line segments of negative edges extending in a direction perpendicular to an x-direction corresponding a horizontal direction in the overhead image by scanning the overhead image output from the viewpoint converter in the x-direction, wherein each line segment has a first end point on a first side with respect to the x-direction and a second end point on a second side with respect to the x-direction;
    a grouping portion that is configured to group the line segments of the positive edges detected by the edge detector into a positive edge group and the line segments of the negative edges detected by the edge detector into a negative edge group, wherein in the positive edge group, each of the line segments of the positive edges has an inclination angle relative to the x-direction excluding the direction perpendicular to the x-direction and the inclination angles of the line segments of the positive edges are close to each other, and wherein in the negative edge group, each of the line segments of the negative edges has an inclination angle relative to the x-direction excluding the direction perpendicular to the x-direction and the inclination angles of the line segments of the negative edges are close to each other;
    a boundary line setting portion that is configured to set, for each of a left diagonal line area and a right diagonal line area: (i) a first boundary line connecting the first end points of the line segments of the positive edges; and (ii) a second boundary line connecting the second end points of the line segments of the negative edges, wherein each of the left diagonal line area and the right diagonal line area includes a plurality of diagonal lines arranged parallel to each other; and
    a parking section identifying portion that is configured to identify a parking section using the second boundary line of the left diagonal area and the first boundary line of the right diagonal area.

2. The image processing device according to claim 1, wherein the parking section identifying portion is further configured to:
    determine whether a distance between the second boundary line of the left diagonal area and the first boundary line of the right diagonal area falls within a predetermined threshold value; and
    identify an area between the second boundary line of the left diagonal area and the first boundary line of the right diagonal area as the parking section based on the determination.

3. A method for processing an image, the method comprising:
    capturing images around a vehicle by a camera that is mounted on the vehicle;

acquiring the images captured by the camera and converting the images that have been acquired into an overhead image;

detecting a portion in which an image signal value of the overhead image increases equal to or more than a first predetermined value as a line segment of a positive edge and a portion in which the image signal value of the overhead image decreases equal to or more than a second predetermined value as a line segment of a negative edge, and executing an edge detection process to detect line segments of positive edges and line segments of negative edges extending in a direction perpendicular to an x-direction corresponding a horizontal direction in the overhead image by scanning the overhead image in the x-direction, wherein each line segment has a first end point on a first side with respect to the x-direction and a second end point on a second side with respect to the x-direction;

grouping the line segments of the positive edges into a positive edge group and the line segments of the negative edges into a negative edge group, wherein in the positive edge group, each of the line segments of the positive edges has an inclination angle relative to the x-direction excluding the direction perpendicular to the x-direction and the inclination angles of the line segments of the positive edges are close to each other, and wherein in the negative edge group, each of the line segments of the negative edges has an inclination angle relative to the x-direction excluding the direction perpendicular to the x-direction and the inclination angles of the line segments of the negative edges are close to each other;

setting, for each of a left diagonal line area and a right diagonal line area: (i) a first boundary line connecting the first end points of the line segments of the positive edges; and (ii) a second boundary line connecting the second end points of the line segments of the negative edges, wherein each of the left diagonal line area and the right diagonal line area includes a plurality of diagonal lines arranged parallel to each other; and identifying a parking section using the second boundary line of the left diagonal area and the first boundary line of the right diagonal area.

4. The method according to claim 3, further comprising:

determining whether a distance between the second boundary line of the left diagonal area and the first boundary line of the right diagonal area falls within a predetermined threshold value; and identifying an area between the second boundary line of the left diagonal area and the first boundary line of the right diagonal area as the parking section based on the determination.

\* \* \* \* \*